(12) United States Patent
Takeda et al.

(10) Patent No.: US 8,356,446 B2
(45) Date of Patent: Jan. 22, 2013

(54) CAPSULE ROOM UNIT AND TWO-LEVEL INSTALLATION STRUCTURE THEREOF

(75) Inventors: Masashi Takeda, Hyogo (JP); Masakuni Takeda, Hyogo (JP)

(73) Assignee: Cosmonde Corp. (JP)

( * ) Notice: Subject to any disclaimer, the term of this patent is extended or adjusted under 35 U.S.C. 154(b) by 118 days.

(21) Appl. No.: 12/881,874

(22) Filed: Sep. 14, 2010

(65) Prior Publication Data

US 2011/0000146 A1 Jan. 6, 2011

(51) Int. Cl.
*E04H 1/00* (2006.01)

(52) U.S. Cl. .......... 52/79.12; 52/79.1; 52/79.9; 52/762; 52/780

(58) Field of Classification Search .................... 52/79.1, 52/79.2, 79.9, 79.12, 79.13, 234, 236.3, 454, 52/583.1, 223.9, 762, 780, 781, 282.1, 282.2
See application file for complete search history.

(56) References Cited

U.S. PATENT DOCUMENTS

| | | | | |
|---|---|---|---|---|
| 3,150,903 A | * | 9/1964 | Chapman et al. | 312/265.4 |
| 3,693,293 A | * | 9/1972 | Egan et al. | 49/56 |
| 3,901,612 A | * | 8/1975 | Canin | 403/189 |
| 5,285,596 A | * | 2/1994 | Kinsey | 49/404 |
| 5,402,608 A | * | 4/1995 | Chu | 52/79.1 |
| 5,413,836 A | * | 5/1995 | Hsieh | 428/188 |
| 5,647,181 A | * | 7/1997 | Hunts | 52/282.1 |
| 6,481,177 B1 | * | 11/2002 | Wood | 52/656.9 |
| 6,802,171 B2 | * | 10/2004 | McKinnon | 52/762 |
| 7,004,667 B2 | * | 2/2006 | Ludwig et al. | 403/258 |
| 7,827,738 B2 | * | 11/2010 | Abrams et al. | 52/79.1 |
| 8,074,415 B2 | * | 12/2011 | Terada et al. | 52/239 |
| 2004/0182016 A1 | * | 9/2004 | Locke | 52/79.13 |
| 2007/0266655 A1 | * | 11/2007 | Howe et al. | 52/282.1 |
| 2007/0271857 A1 | * | 11/2007 | Heather et al. | 52/79.9 |

FOREIGN PATENT DOCUMENTS

| | | | |
|---|---|---|---|
| EP | 284537 A2 | * | 9/1988 |
| JP | 0113712 Y | | 4/1989 |
| JP | 0139329 Y | | 11/1989 |
| JP | 0215956 A | | 4/1990 |
| JP | 11182078 A | | 7/1999 |
| JP | 2005248515 A | | 9/2005 |

* cited by examiner

*Primary Examiner* — Brian Glessner
*Assistant Examiner* — Adam Barlow
(74) *Attorney, Agent, or Firm* — St. Onge Steward Johnston & Reens LLC

(57) ABSTRACT

A capsule room unit for use as a capsule bed or other private space has a horizontally oblong rectangular parallelepiped room framework formed by columns, beams and panel materials fitted into the room framework to constitute a ceiling, a floor and walls, wherein the columns and the beams are composed of extruded materials each having a longitudinally consecutive groove. The panel materials of the ceiling and walls are composed of synthetic resin or FRP hollow panel materials each having peripheral flanges at a periphery along a plane direction, and the flanges of the hollow panel material are inserted and fitted to the grooves of the extruded materials.

10 Claims, 14 Drawing Sheets

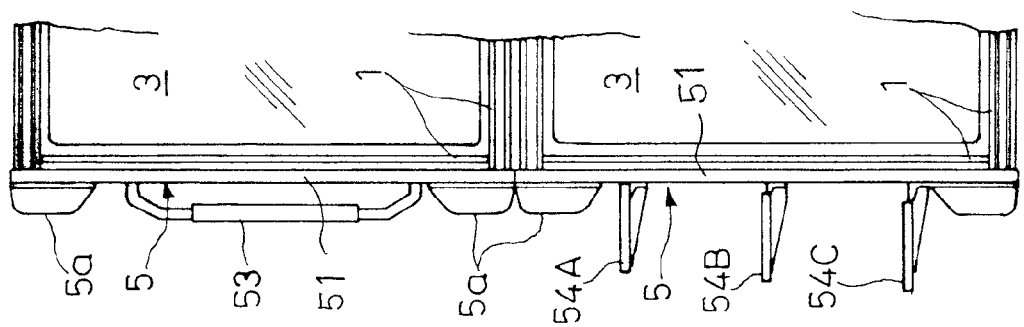
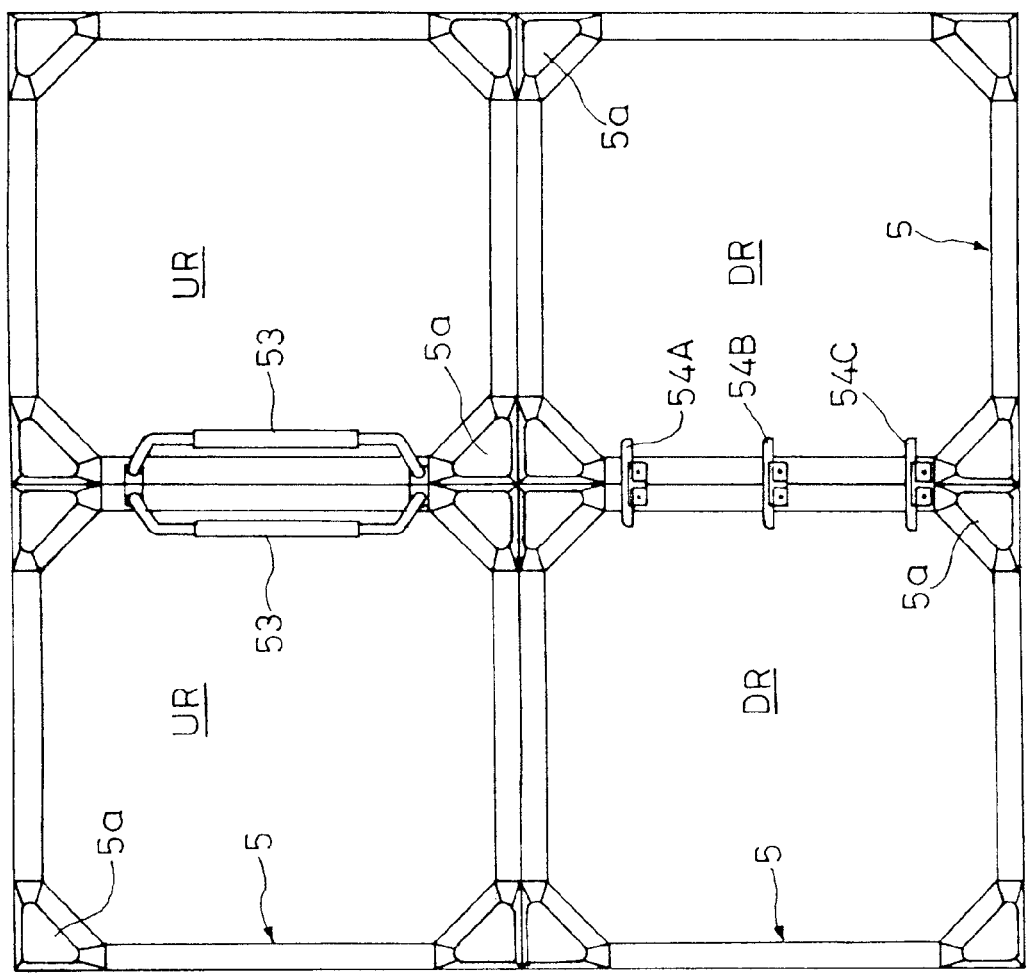

CAPSULE ROOM UNIT AND TWO-LEVEL INSTALLATION STRUCTURE THEREOF

CROSS-REFERENCE TO RELATED APPLICATIONS

The present application is related in subject matter to co-pending Japanese application No. JP2009-111565 filed Apr. 8, 2009, the content of which is incorporated herein by reference.

FIELD OF THE INVENTION

The present invention relates to a capsule room unit constituting a private space used for sleeping, resting, temporary housing in a disaster, habitation in special environments and the like, including a capsule bed for simple lodging, and a two-level installation structure of capsule room units.

BACKGROUND OF THE INVENTION

A capsule bed for simple lodging is generally composed of a capsule main body having a horizontally oblong substantially rectangular parallelepiped shape, provided with an opening for entrance at one surface thereof and formed of fiberglass reinforced plastic (FRP), and support frames formed of structural die steel materials such as angle bars, channel bars, etc., for installing the capsule main body. Frequently used as the capsule main body is one configured that an entrance periphery thereof is composed of an integrally-formed rectangular opening peripheral frame and a body thereof is dividedly formed by two frame members of a right and a left halved at a width-direction central portion or by three frame members of right and left side frames each including a halved ceiling or floor, and a floor frame or a ceiling frame.

In assembling prior capsule beds, the following methods have been employed: Die steel materials of support frames are assembled lengthwise, breadthwise and depthwise in advance so as to form each side of the rectangular parallelepiped, into which the afore-described respective frame members are carried in a predetermined order, thereby assembling the capsule main body (patent document 1). Die steel materials of support frames are assembled so as to form each side of the rectangular parallelepiped outside the body of the capsule main body having been preassembled, and then an entrance front mask (opening peripheral frame) and exterior panels are mounted to the support frames (patent document 2). In a two-level installation structure, support frames composed of support struts in four corners and upper and lower, two levels of floor joist framing are constructed and then the capsule main body having been assembled is installed on each floor joist framing (patent document 3).

Further, there have been proposed in recent years that the capsule main body is composed of an end panel at longitudinal both ends, a front and rear side panels of each of right and left side walls, a plurality of ceiling panels and a plurality of floor panels, respectively, and an opening for entrance is provided at a position of the end panels or side panels (patent document 4), an aspect ratio in plane view of the capsule main body is defined as 1:2, and panels having a width equal to a longitudinal dimension are combined to constitute the capsule main body (patent document 5), thereupon reducing a size and the kind of components (panels).

Prior Art Documents:

Patent document 1: Japanese Examined Utility Model Application Publication No. H01-13712

Patent document 2: Japanese Examined Utility Model Application Publication No. H02-15956

Patent document 3: Japanese Examined Utility Model Application Publication No. H01-39329

Patent document 4: Japanese Patent Application Laid-Open Publication No. H11-182078

Patent document 5: Japanese Patent Application Laid-Open Publication No. 2005-248515

However, assembling each of the capsule main body and the support frames and the operation of assembling the the capsule main body and the support frames together to integrate each other involve a great amount of time and effort in conventional capsule beds including the foregoing proposed ones. Thus, there is a problem of expending enormous time and effort, including a mounting operation to an installation site. Further, the conventional capsule beds are insufficient in terms of air tightness, sound insulation performance, thermal insulation performance.

Therefore, the present invention was made in view of the foregoing circumstances, and accordingly, an object of the present invention is to provide a capsule room unit constituting a variety of private spaces including the afore-described capsule beds, wherein assembling and mounting to an installation site thereof can be carried out with less effort and a high degree of efficiency in a short time, and being superior in terms of air tightness, light blocking, sound insulation performance, thermal insulation performance, etc., of a private space.

SUMMARY OF THE INVENTION

In order to achieve the afore-described object, a capsule room unit according to a first aspect of the present invention is configured such that columns in respective four room corners and beams bridged between upper ends and lower ends of the columns form a horizontally oblong rectangular parallelepiped room framework, and panel materials having been fitted into the room framework constitute a ceiling, a floor and walls. The columns and the beams are composed of extruded materials each having a longitudinally consecutive groove. The panel materials of the ceiling and walls are composed of synthetic resin or FRP hollow panel materials each having flanges at a periphery thereof along a plane direction. The flanges of the hollow panel materials are inserted and fitted to the grooves of the extruded materials.

A second aspect of the present invention is configured such that the extruded materials are provided with an insert-fit groove and a non-insert-fit groove with respect to the flanges of the hollow panel materials in the capsule room unit of the first aspect. The non-insert-fit groove is configured to have a wide bottom. Ends of extruded materials orthogonal to each other in the room framework are coupled to each other via a screw clamp fitting slidingly inserted and fitted to the non-insert-fit grooves of respective extruded materials.

A third aspect of the present invention is configured such that at least first flanges parallel to each other of the hollow panel material are formed into a club shape, the grooves of the extruded materials corresponding to the club-shaped flanges have a wide bottom and an opening width narrower than a thickness of a distal side of the club-shaped flanges, and each of the club-shaped flanges is slidingly inserted and fitted to each of the wide bottom grooves from one end side in the capsule room unit of the first or second aspect.

A fourth aspect of the present invention is configured such that, regarding a side surface provided with an entrance opening in the room framework as a front side surface, end surfaces of back-and-forth-direction beams constituting the room framework are positioned in four corners of the front side surface and a rear side surface, respectively, a coupling rod inserted into each of the beams has a threaded portion at both ends thereof penetrating steel backing materials which are made to abut against front and rear end surfaces, respectively, and nuts are threadingly secured to the front and rear threaded portions from the outside in the capsule room unit of any one of the first to third aspects.

A fifth aspect of the present invention is configured such that the steel backing material at the front side surface constitutes a rectangular dressed frame which covers a front surface of a rectangular frame composed of the extruded material in the room framework in the capsule room unit of the fourth aspect.

A sixth aspect of the present invention is configured such that the columns and beams of the room framework are composed of extruded materials each having a plurality of grooves and an identical sectional shape in the capsule room unit of any one of the first to fifth aspects.

A seventh aspect of the present invention is configured such that the extruded material has a sectional outline of a rectangle at an aspect ratio of 2/1, and is provided with one groove on respective narrow side surfaces of the rectangle and two grooves on respective wide side surfaces in the capsule room unit of any one of the first to sixth aspects.

An eighth aspect of the present invention is configured such that the extruded material has a hollow portion located at a width-direction central portion which is not in communication with the grooves in the capsule room unit of any one of the first to seventh aspects.

A ninth aspect of the present invention is configured such that an accordion shutter which stretchingly and resiliently opens and closes with the grooves of the extruded material serving as guide rails is provided at the entrance opening in the capsule room unit of any one of the first to eighth aspects.

A two-level installation structure of a capsule room unit according to a tenth aspect of the present invention is configured such that two units of the capsule room units according to any one of the first to ninth aspects are installed at two levels, upper and lower, respectively, and upper capsule room units have a floor arranged with a fireproof board.

An eleventh aspect of the present invention is configured such that the fireproof board is composed of a plywood laminate at least having a lower surface side provided with an inorganic heat insulating layer in the two-level installation structure of the capsule room unit of the tenth aspect.

A twelfth aspect of the present invention is configured such that the fireproof board constitutes the panel material of the floor in the two-level installation structure of the capsule room unit of the tenth or eleventh aspect.

A thirteenth aspect of the present invention is configured such that the grooves are provided at a lower surface side of lower beams in the room framework of an upper capsule room unit and an upper surface side of upper beams in the room framework of a lower capsule room unit, and the upper capsule room unit is supported on the lower capsule room unit by a support fitting positioned between both grooves, while suspended in the two-level installation structure of the capsule room unit of any one of the tenth to twelfth aspects.

A fourteenth aspect of the present invention is configured such that the capsule room unit is a capsule bed in the two-level installation structure of the capsule room unit of any one of the tenth to thirteenth aspects.

The capsule room unit according to the first aspect of the present invention is such that panel materials are fitted into a horizontally oblong rectangular parallelepiped room framework composed of extruded materials each having a longitudinally consecutive groove, thereby constituting a ceiling, a floor and walls. Accordingly, there is no need to construct a room main body and support frames separately and assemble them as in the conventional manner. Additionally, the panel materials of the ceiling and walls are composed of synthetic resin or FRP hollow panel materials each having flanges at the periphery thereof, and the flanges are inserted and fitted to the grooves of the extruded materials. Therefore, the assembling and mounting to an installation site can be carried out with less effort, with ease and a high degree of efficiency in a short time. Furthermore, the ceiling and the walls are composed of hollow panel materials, so that high sound insulation performance and heat insulation performance can be attained. Since the flanges at the periphery of the panel material are inserted and fitted to the grooves of the extruded materials, a gap is not created in fitting portions of the panel materials, and light leakage between the inside and the outside and drafts can completely be prevented, whereby excellent comfortability as a private space can be secured. Further, wiring to a variety of parts within the room can be provided so as not to be exposed by using the grooves and hollow portion of the extruded material. A reduction in the cost of components and components management also can be achieved by commonality of the extruded material among the respective portions of the room framework and the hollow panel material among the respective surfaces.

According to the second aspect of the present invention, there is no need to provide machining such as boring, removing, cutting, screw cutting, etc., to the extruded materials at the time of coupling and fixing respective ends of extruded materials arranged orthogonal to each other in the room framework. The ends can be coupled and fixed remarkably easily and reliably only by screwing operation with the use of a screw clamp fitting slidingly inserted and fitted to respective bottom wide grooves of the extruded materials.

According to the third aspect of the present invention, the club-shaped flange of the hollow panel material is slidingly inserted and fitted to the bottom wide groove of the extruded material from one end side. Thus, there is no concern that the panel material is detached from the room framework even if a large force is applied to the panel surface, for example, somebody leans against the panel surface.

According to the fourth aspect of the present invention, end surfaces of back-and-forth-direction beams are positioned in four corners of the front side surface at which the entrance opening of the room framework is located and the rear side surface, respectively, and a coupling rod inserted into each of the beams has a threaded portion at both ends thereof penetrating steel backing materials and then secured by nuts from the outside, respectively. Thus, assembly strength of the room framework is significantly increased through the coupling rods, and it becomes possible for accessories such as a handle, a step, a number plate, etc., to be mounted tightly with use of the steel backing material at the front side surface.

According to the fifth aspect of the present invention, the steel backing material at the front side surface constitutes a rectangular dressed frame, which covers a front surface of a rectangular frame composed of the extruded material in the room framework. Therefore, design effect of improving appearance of the entrance periphery and reinforcing effect of the room framework can be attained by the rectangular dressed frame.

According to the sixth aspect of the present invention, the columns and beams of the room framework are composed of extruded materials each having a plurality of grooves and an identical sectional shape. Consequently, the entire room framework can inexpensively be constructed of a single raw material, and the lengths of the extruded materials have only to be made in agreement and there is no need to make the use suit the front, rear, right, left, upper and lower at the time of assembly. As a result, effort in assembling operation is remarkably saved.

According to the seventh aspect of the present invention, the extruded material has a sectional outline of a rectangle at an aspect ratio of 2/1, and is provided with one groove to respective narrow side surfaces and two grooves to respective wide side surfaces. Thus, differences in orientation of the grooves used by the components of the room framework and in number of the grooves can be dealt with easily. Further, the extruded material has the same shape when inverted, and thus provides usability at the time of assembling the room framework.

According to the eighth aspect of the present invention, a width-direction central portion of the extruded material is provided with a hollow portion, which is not in communication with the grooves. Thus, the hollow portion can be used as an insertion part of the afore-described coupling rod or a wiring space, and the extruded material itself becomes very strong.

According to the ninth aspect of the present invention, a shutter, which opens and closes with the grooves of the extruded material serving as guide rails can be attached to the entrance opening easily.

According to the tenth aspect of the present invention, a fireproof board is arranged at the floor side of upper capsule room units in a state where the capsule room units of any one of the first to ninth aspects are installed at two levels, thereby preventing a fire spreading between upper and lower capsule room units at the time of fire.

According to the eleventh aspect of the present invention, the fireproof board is composed of a plywood laminate at least having a lower surface side provided with an inorganic heat insulating layer. Thus, a good fire spreading preventing function and strength as a fireproof board can be attained.

According to the twelfth aspect of the present invention, the fireproof board is used for the floor panel of the upper capsule room unit as well. Therefore, costs of components are reduced accordingly, and also the assembling and manufacturing of the capsule room unit takes less time and effort.

According to the thirteenth aspect of the present invention, the support fitting with the use of grooves of the beams composed of the extruded materials in the room frameworks of upper and lower capsule room units allows the upper capsule room unit to be supported on the lower capsule room unit easily and reliably while suspended.

According to the fourteenth aspect of the present invention, a two-level installation structure of a capsule bed is provided.

BRIEF DESCRIPTION OF THE DRAWINGS

FIG. 4A is a perspective view of an external L-shaped fitting, FIG. 4B is a perspective view of a grooved nut and FIG. 4C is a perspective view of a tandem grooved nut;

FIG. 10A is a front view, FIG. 10B is a sectional view taken along an arrow line X-X of FIG. 10A and FIG. 10C is a sectional view taken along an arrow line Y-Y of FIG. 10A;

FIG. 16A is a partially cutaway side view of a front side upper portion, FIG. 16B is a partially cutaway side view of a rear side upper portion and FIG. 16C is a rear side view of a rear upper portion;

FIG. 17A-B shows the capsule room units installed at two levels in two horizontal rows, and FIG. 17A is a front view and FIG. 17B is a side view of a front;

FIG. 18A is a schematic front view, FIG. 18B is an enlarged front view of a left side main part and FIG. 18C is an enlarged longitudinal sectional side view of a front side central portion; FIG. 19A is a front view mainly showing an upper side and FIG. 19B is a plane view of the upper side.

DETAILED DESCRIPTION OF THE INVENTION

Hereinafter, embodiments of the present invention which are applied to a capsule room unit used as a capsule bed are described in detail with reference to the drawings.

Figure 1:
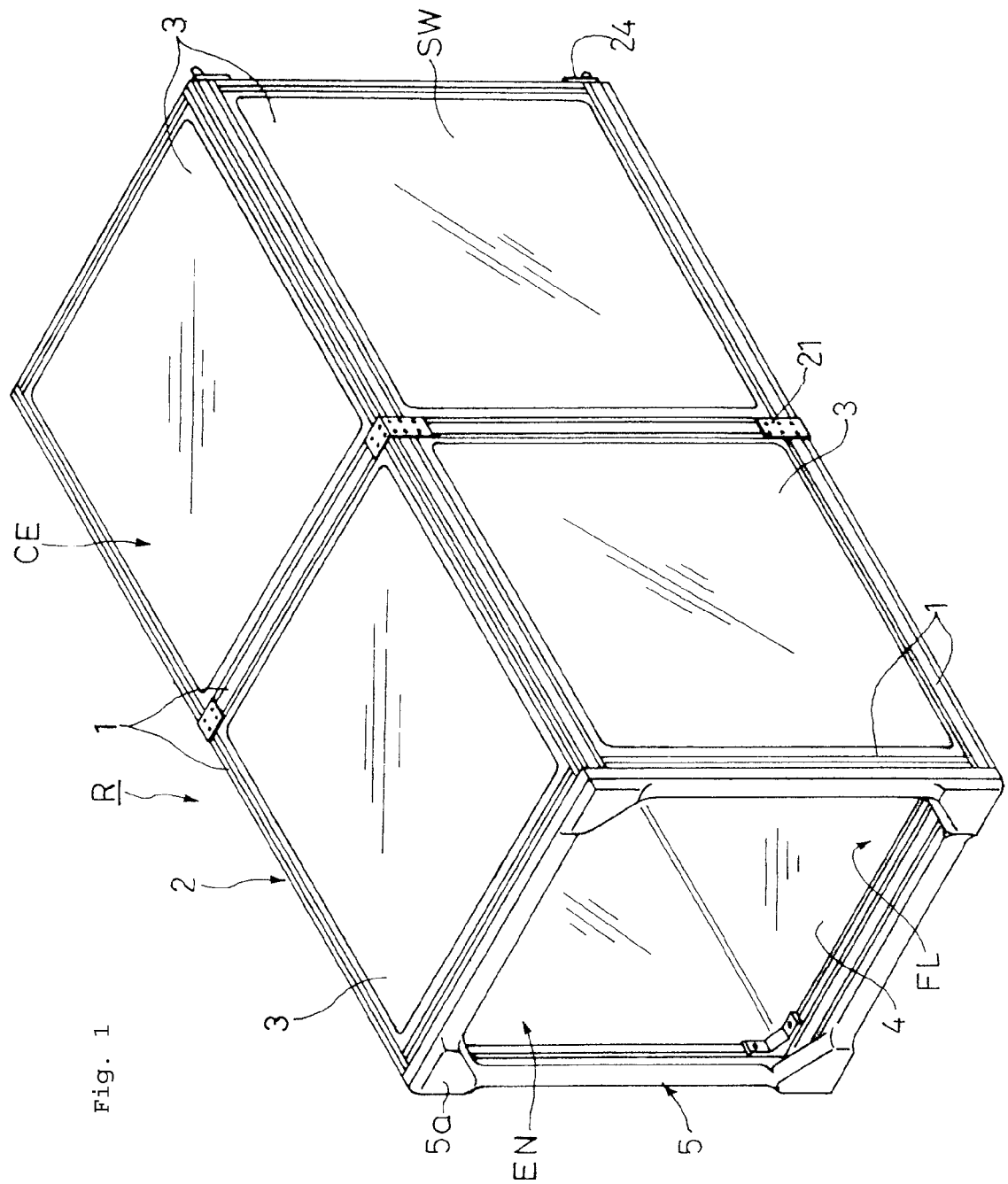
FIG. 1 is a perspective view of a capsule room unit according to one embodiment of the present invention.

A capsule room unit R shown in FIG. 1 has a horizontally oblong box shape with one end side in a longitudinal direction (hereinafter, referred to as a front) serving as an entrance opening EN. A room framework 2 is constructed into a horizontally oblong rectangular parallelepiped shape from aluminum or aluminum alloy extruded materials 1. Hollow panel materials 3 of synthetic resin blow-molded articles are fitted into the room framework 2 to constitute a ceiling CE, right and left side walls SW and a rear wall RW (see FIG. 11), and a floor panel material 4 is fitted into the room framework 2 to constitute a floor FL. A square dressed frame 5 is mounted on a front surface of a rectangular frame positioned at a periphery of the entrance opening EN and composed of the extruded material 1.

Figure 2:
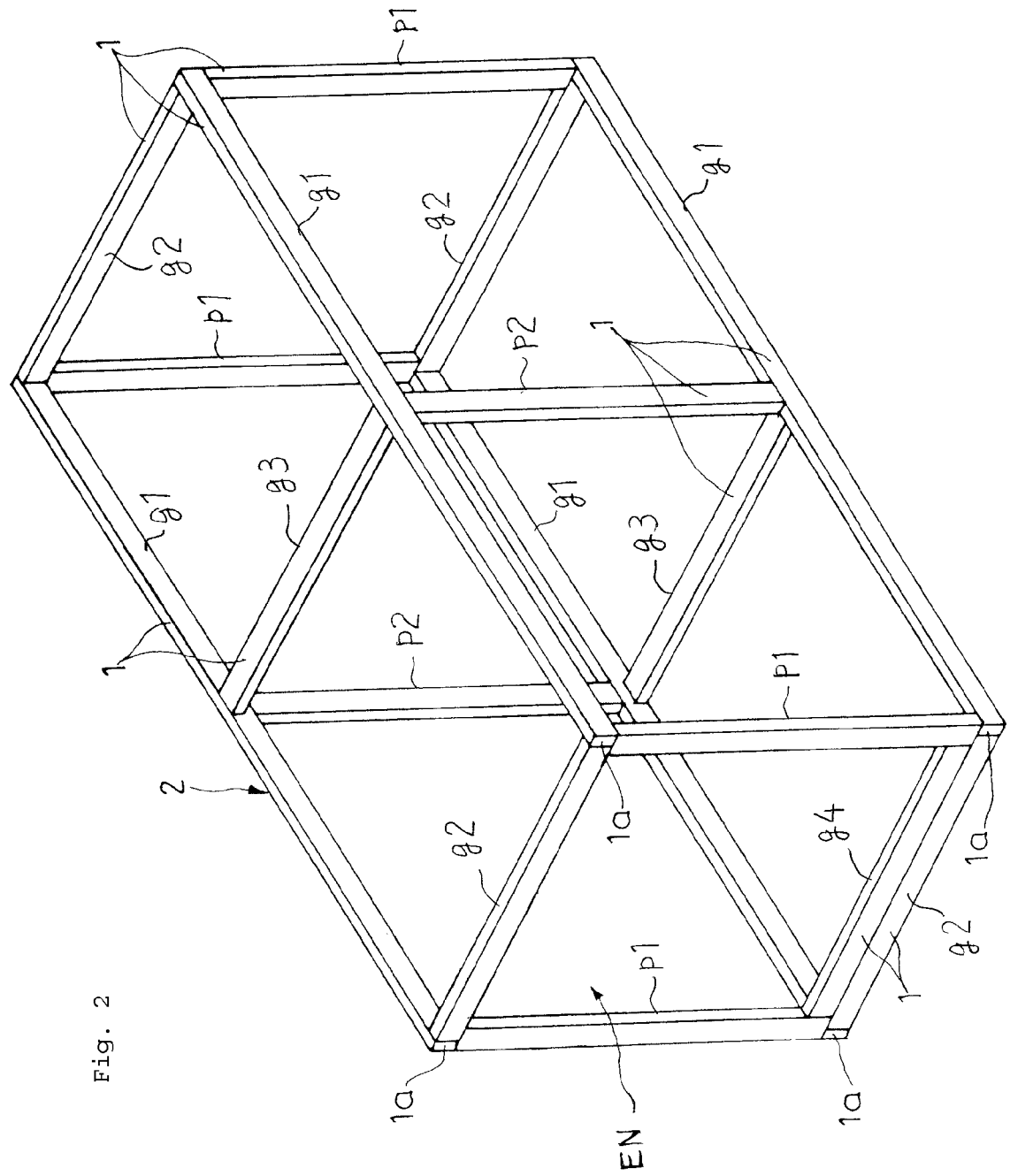
FIG. 2 is a perspective view schematically showing a room framework of the capsule room unit.

As schematically shown in FIG. 2, the room framework 2 has a horizontally oblong rectangular parallelepiped frame body composed of four columns p1 in respective four room corners, four longer beams g1 bridged between upper ends and lower ends of the columns along a back-and-forth direction, four shorter beams g2 bridged between the upper ends and the lower ends along a right-and-left direction. Two intermediate columns p2 and two intermediate beams g3 are arranged between the longer beams g1 at a back-and-forth-direction central position, respectively. Further, a modesty panel beam g4 is arranged at a lower portion of the entrance opening EN in such a manner as to lie on the shorter beam g2.

The columns p1 and p2 and the beams g1 to g4 are composed of the same extruded materials 1 at an aspect ratio of 1/2 in cross section. The columns p1 and p2 and the beams g2 and g3 have a substantially half length of the longer beams g1 along the back-and-forth direction, and the modesty panel beam g4 is slightly shorter than the beams g2 and g3. The beams g1, g2 and g4 all have wide side surfaces extending vertically while the intermediate beam g3 have wide side surfaces extending horizontally. Four of left, right, upper and lower beams g1 along the back-and-forth direction are assembled in such a manner that both a front and a rear end surface 1a are exposed. On the other hand, the columns p1 in the four room corners have wide side surfaces oriented to the back-and-forth direction while the intermediate columns p2 have wide side surfaces oriented to the right-and-left direction.

Figure 3:
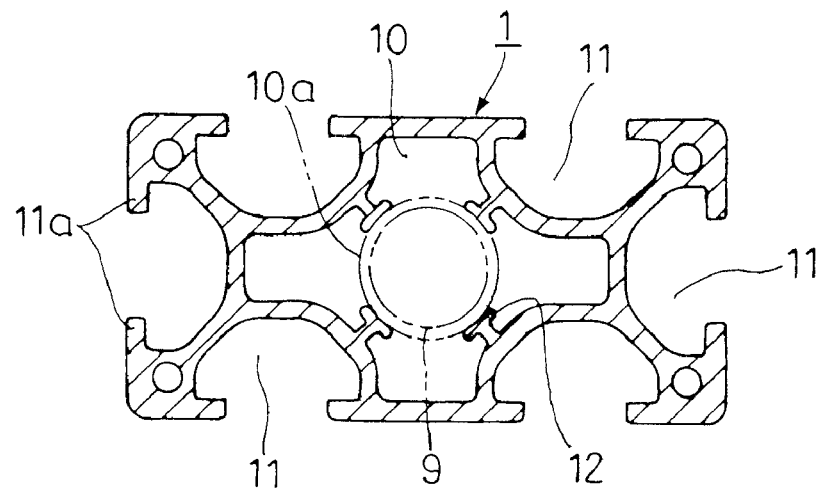
FIG. 3 is a sectional view of an extruded material used for the room framework.

The extruded material 1 constituting the columns p1 and p2 and the beams g1 to g4 includes a total of six grooves 11 consecutive in the longitudinal direction, i.e., two on respective wide side surfaces and one on respective narrow side surfaces as shown in FIG. 3. A central part in cross section of the extruded material 1 forms a hollow portion 10 which is not in communication with the grooves 11. The six grooves 11 are configured to have the same shape and dimension, and include flanges 11a projecting from both sides of an opening edge as opposed to each other, thereby having a wide bottom. Further, protrusions 12 projecting from four directions toward the center so as to surround a virtual circle 10a and having a cross section of a T-shape are integrally formed inside the hollow portion 10.

Respective ends of the columns p1 and p2 and beams g1 to g4, which are arranged orthogonal to each other, are threadingly coupled to each other with the use of respective grooves 11 of the extruded materials 1 constituting the columns and beams via a screw clamp fitting slidingly inserted and fitted to the grooves 11. For this thread coupling, a combination of an exterior L-shaped fitting 6 shown in FIG. 4A and a grooved nut 7A or a tandem grooved nut 7B shown in FIG. 4B or FIG. 4C serving as a screw clamp fitting, or a combination of an L-shaped inner joint 8 shown in FIG. 6, an L-shaped backing plate 21 shown in FIG. 9 and the afore-described grooved nut 7A or 7B is employed, for example.

Figure 4A:
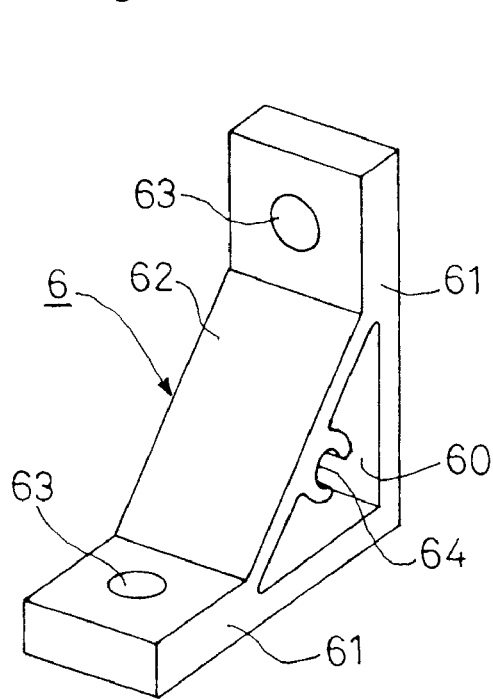
FIG. 4A-C exemplifies a coupling tool used for constructing the room framework.
Figure 4B:
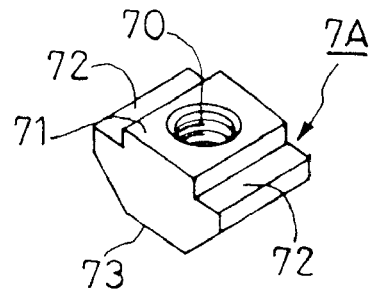
Figure 4C:
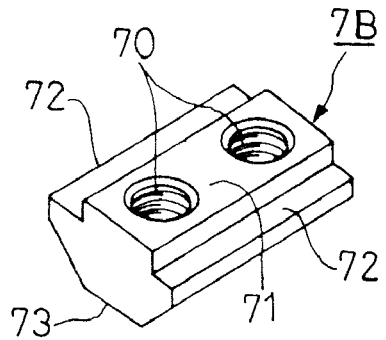

The exterior L-shaped fitting 6 shown in FIG. 4A has a pair of band-shaped side pieces 61 arranged at a right angle and an inclined piece 62 joining central portions of the side pieces 61, thereby constituting an isosceles right triangle frame 60. A screw insertion hole 63 is provided at a distal end of each side piece 61. A C-shaped screw hole 64 is formed on an inner surface of the inclined piece 62. The grooved nut 7A shown in FIG. 4B is of a substantially square shape in plane view and a substantially inverted trapezoidal gambrel shape in side view. The grooved nut 7A is formed with a step 72 at both sides of a rectangular convex portion 71 in the center on an upper surface thereof and is provided with a threaded hole 70 penetrating vertically in a central position. The tandem grooved nut 7B shown in FIG. 4C has a form that two pieces of the grooved nuts 7A are integrated, and is substantially rectangular in plane view and a substantially inverted trapezoidal block-like shape in side view. The grooved nut 7B is formed with two threaded holes 70 at a rectangular convex portion 71 in the center on an upper surface side thereof. Both grooved nuts 7A and 7B are configured such that the rectangular convex portion 71 has a width slightly narrower than an opening width of the groove 11 of the extruded material 1 but an entire width including both steps 72 is wider than the opening width of the groove 11, whereby the rectangular convex portion 71 can be slidingly inserted and fitted to the groove 11 from one end side of the extruded material 1 in such a manner as to be sandwiched between the opening edges as shown in FIG. 5.

Figure 5:
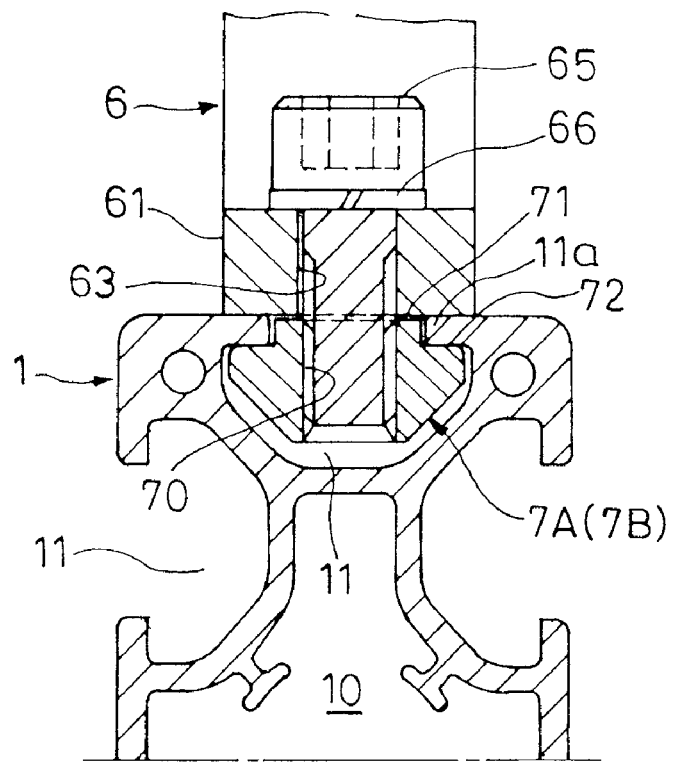
FIG. 5 is a sectional view showing a coupling configuration of the external L-shaped fitting and the grooved nut.

FIG. 5 shows a state of screwing the exterior L-shaped fitting 6 having been arranged outside the groove 11 of the extruded material 1 with the use of the grooved nut 7A (or 7B) having been slidingly inserted and fitted to the groove 11. More specifically, the side piece 61 of the exterior L-shaped fitting 6 is applied outside the groove 11, a fixing screw 65 having been threadingly inserted through the screw insertion hole 63 via a washer 66 is inserted and secured in the threaded hole 70 of the grooved nut 7A (or 7B), whereby the flanges 11a of the groove 11 are sandwiched and fixed between the side piece 61 of the exterior L-shaped fitting 6 and the steps 72 of the grooved nut 7A (or 7B), and resultingly the exterior L-shaped fitting 6 is fixed to the extruded material 1.

Figure 6:
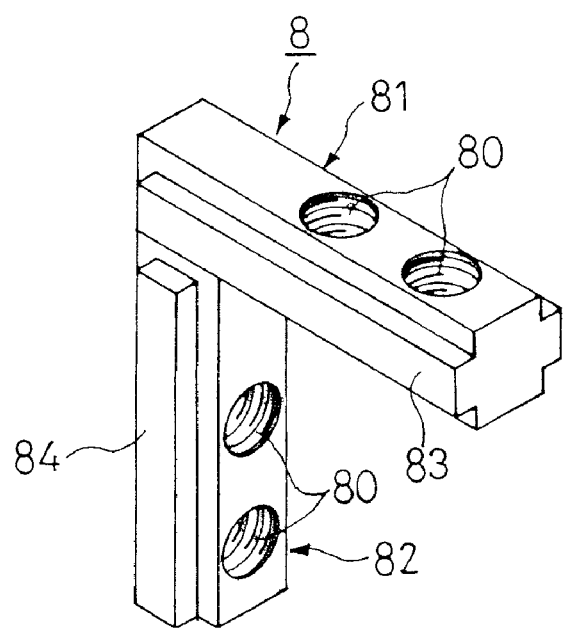
FIG. 6 is a perspective view of an inner joint used for constructing the room framework.

The inner joint 8 shown in FIG. 6 has a pair of shaft-shaped side pieces 81 and 82 arranged at a right angle, to which two threaded holes 80 whose axial directions are along the in-plane of the right angle arrangement are provided respectively. Further, protrusions 83 and 84 are formed on both side surfaces devoid of the threaded holes 80. It is noted that the protrusions 83 of the side piece 81 and the protrusions 84 of the side piece 82 are discontinuous. Both side pieces 81 and 82 are configured such that a width thereof is slightly narrower than the opening width of the groove 11 of the extruded material 1 but an entire width including the protrusions 83 and 84 at both sides thereof is wider than the opening width of the groove 11, thereby being able to be slidingly inserted and fitted into the groove 11 from one end side of the extruded material 1 in the same manner as the grooved nuts 7A and 7B.

Figure 7:
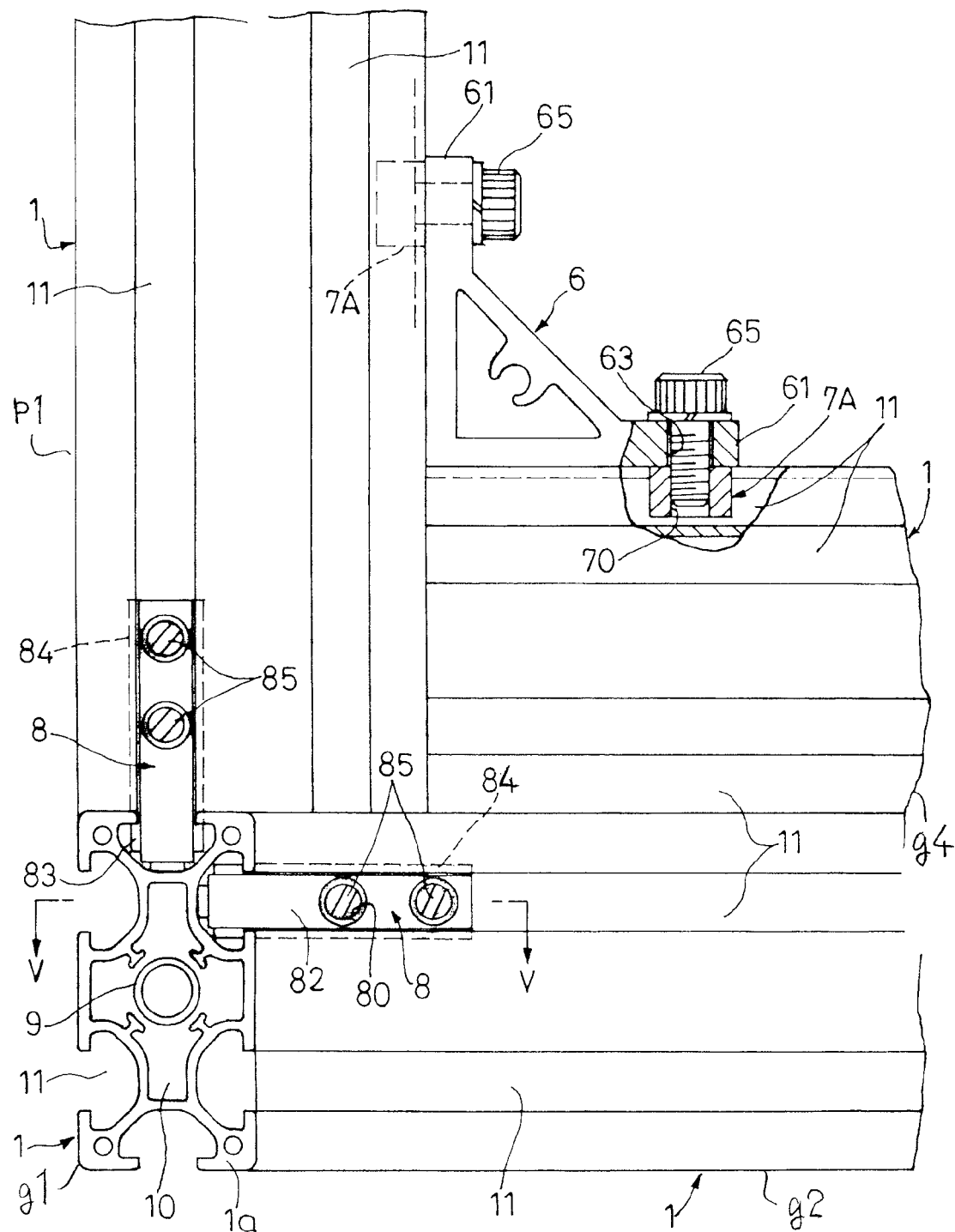
FIG. 7 is a front view showing a coupling configuration of a front side left lower portion of the room framework.
Figure 8:
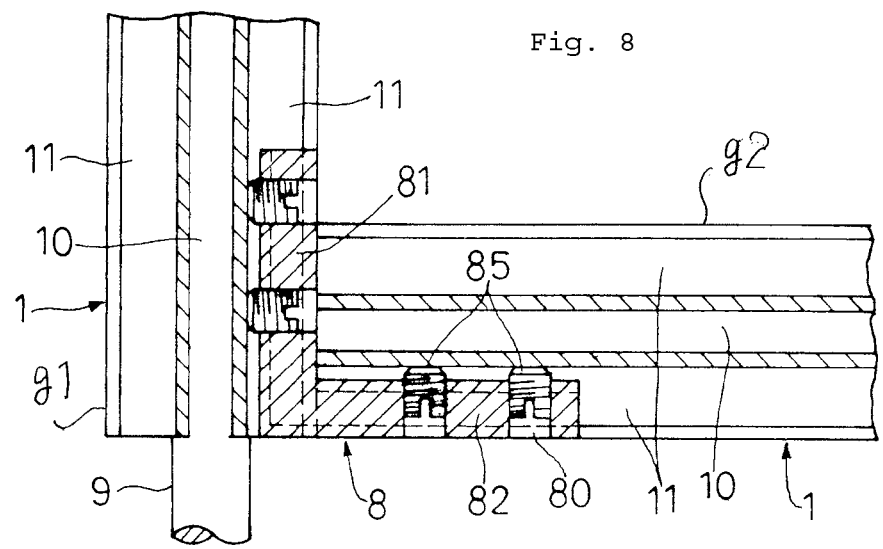
FIG. 8 is a sectional view taken along an arrow line V-V in FIG. 7.

FIG. 7 shows a front side left lower portion of the room framework 2. Herein, a front end of the back-and-forth-direction beam g1 is coupled to a lower end of the column p1 and a left end of the right-and-left-direction beam g2 via the inner joints 8, respectively, and the lower end of the column p1 and a left end of the modesty panel beam g4 are coupled to each other via the exterior L-shaped fitting 6 and the grooved nut 7A. The coupling by the inner joint 8 is such that one of the side pieces 81 is first inserted and fitted into the groove 11 of the extruded material 1 constituting the back-and-forth-direction beam g1 from its exposed end surface 1a and then the locking screws 85 are threadingly inserted and tightened in respective threaded holes 80, as also shown in FIG. 8. By this tightening, a distal end of the locking screw 85 is pressed on a inner bottom of the groove 11, whereby side surfaces of the protrusions 83 at both sides of the side piece 81 press-contact with the flanges 11a of the groove 11 and resultingly the side piece 81 is fixed to the groove 11. As a result, the inner joint 8 is fixed to the extruded material 1 while the other side piece 82 thereof is upright from the groove 11. Subsequently, the other upright side piece 82 of the inner joint 8 is inserted and fitted into the groove 11 of the extruded material 1 constituting the column p1 or beam g2 to be coupled from its end surface 1a. The locking screws 85 are threadingly inserted and tightened in respective threaded holes 80 in the same manner. As a result, side surfaces of the protrusions 84 at both sides of the side piece 82 press-contact with the flanges 11a of the groove 11, whereby the side piece 82 is fixed to the groove 11. Accordingly, the back-and-forth-direction beam g1 and the right-and-left-direction beam g2 or column p1 are coupled to each other. It is noted that this kind of coupling configuration is also employed at a front side right lower portion, front side left and right upper portions, rear side left and right upper portions, rear side left and right lower portions of the room framework 2.

Figure 9:
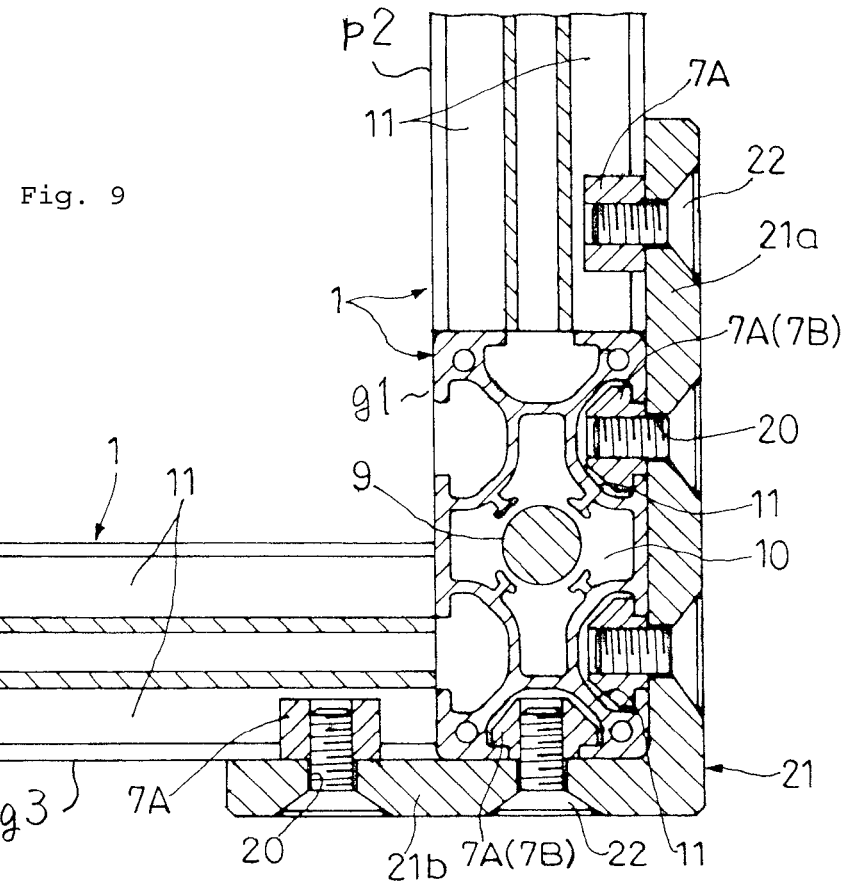
FIG. 9 is a longitudinal sectional view showing a coupling configuration of a column and beams in a back-and-forth-direction central portion of the room framework.

FIG. 9 shows a right lower portion of a longitudinal-direction central portion of the room framework 2. Herein, the back-and-forth-direction beam g1, the intermediate column p2 and intermediate beam g3 are coupled to each other by a combination of the L-shaped backing plate 21 and the grooved nut 7A (or 7B). The L-shaped backing plate 21 has a vertical piece 21a abutting from a side surface lower portion of the intermediate column p2 to a side surface of the beam g1, and a horizontal piece 21b abutting from a bottom surface of the beam g1 to a bottom surface right end of the intermediate beam g3, thereby forming an L shape. The L-shaped backing plate 21 is provided with respective pairs of screw insertion holes 20 corresponding to respective grooves 11 on the abutting surfaces of the beams g1 and g3 and column p2. A flat countersunk head screw 22 having been inserted through each screw insertion hole 20 is threadingly secured to the threaded hole 70 of the grooved nut 7A (or 7B) having been inserted and fitted to each groove 11 in advance, thereby coupling the beams g1 and g3 and the column p2. This kind of coupling configuration is also employed at a left side lower portion and left and right upper portions of the longitudinal-direction central portion of the room framework 2.

Figure 10A:
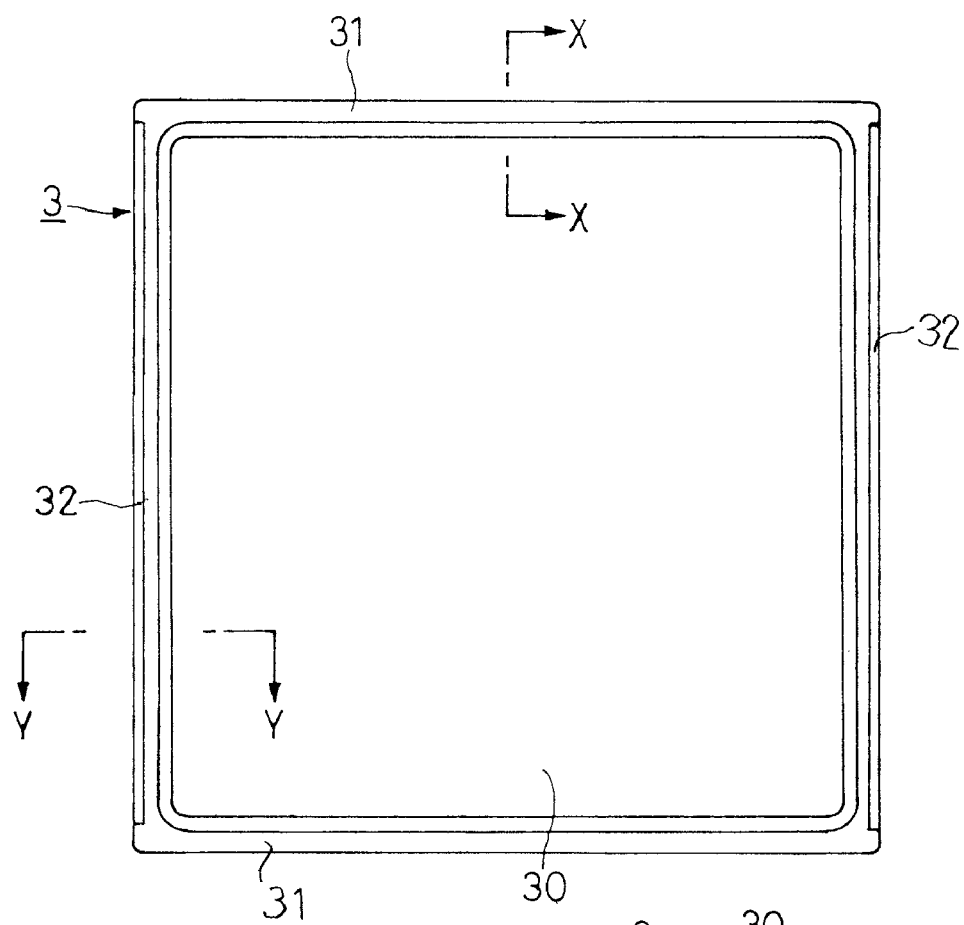
FIG. 10A-C shows a hollow panel member used for the capsule room unit.
Figure 10B:
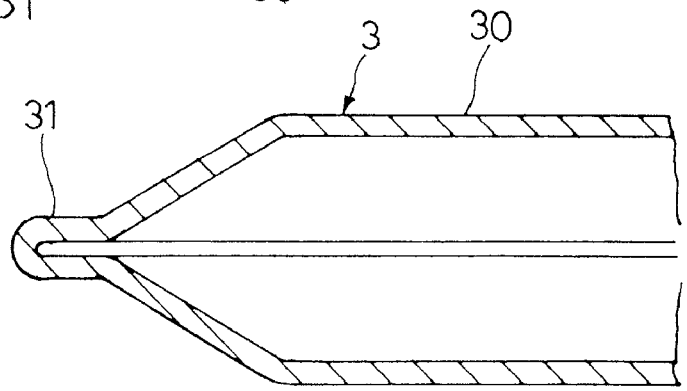
Figure 10C:
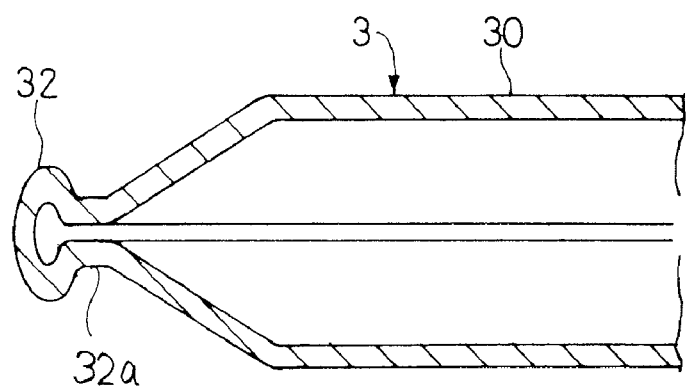

The hollow panel material 3 constituting the ceiling CE, left and right side walls SW and rear wall RW of the capsule room unit R has a panel main body 30 with a substantially square hollow thick plate shape, and thin flanges 31 and 32 integrally formed at a periphery of the main body 30 as shown in FIG. 10A. First flanges 31 parallel to each other are flat as shown in FIG. 10B while second flanges 32 parallel to each other are formed to be club-shaped such that a distal end side thereof is swollen in the longitudinal cross section as shown in FIG. 10C. A thickness of the panel main body 30 is substantially equal to a width of the narrow side surface of the extruded material 1 used for the room framework 2. The flat flange 31 has a thickness sufficient to vertically enter and leave the groove 11 of the extruded material 1. On the other hand, the club-shaped flange 32 has a constricted base 32a whose thickness is thinner than the opening width of the groove 11 of the extruded material 1, while the swollen distal end side thereof is larger than the opening width of the groove 11. Accordingly, the flange 32 can be slidingly inserted and fitted to the groove 11 from one end side but cannot enter or leave the groove 11 vertically.

Figure 11:
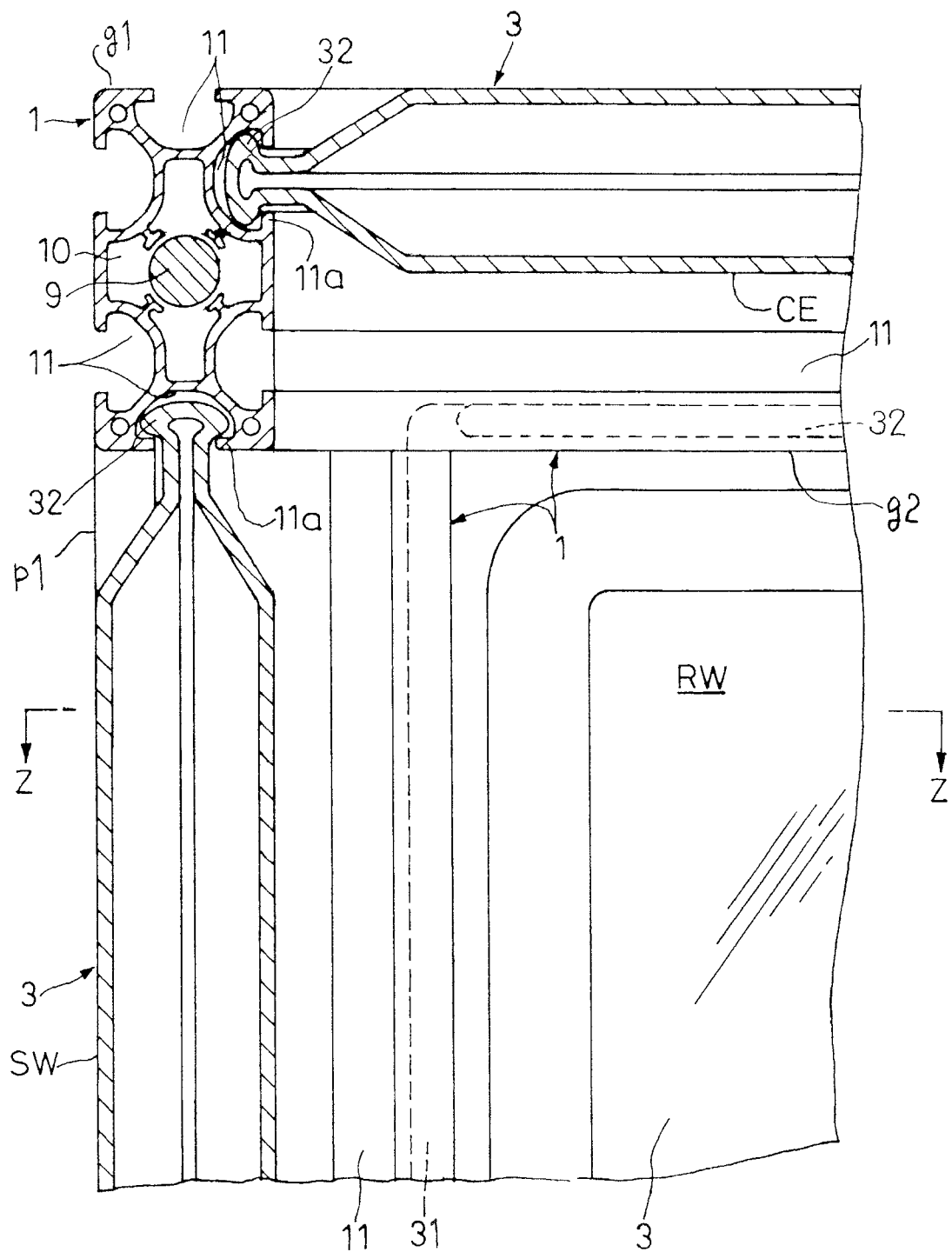
FIG. 11 is a longitudinal sectional view of a left side upper portion of the capsule room unit.
Figure 12:
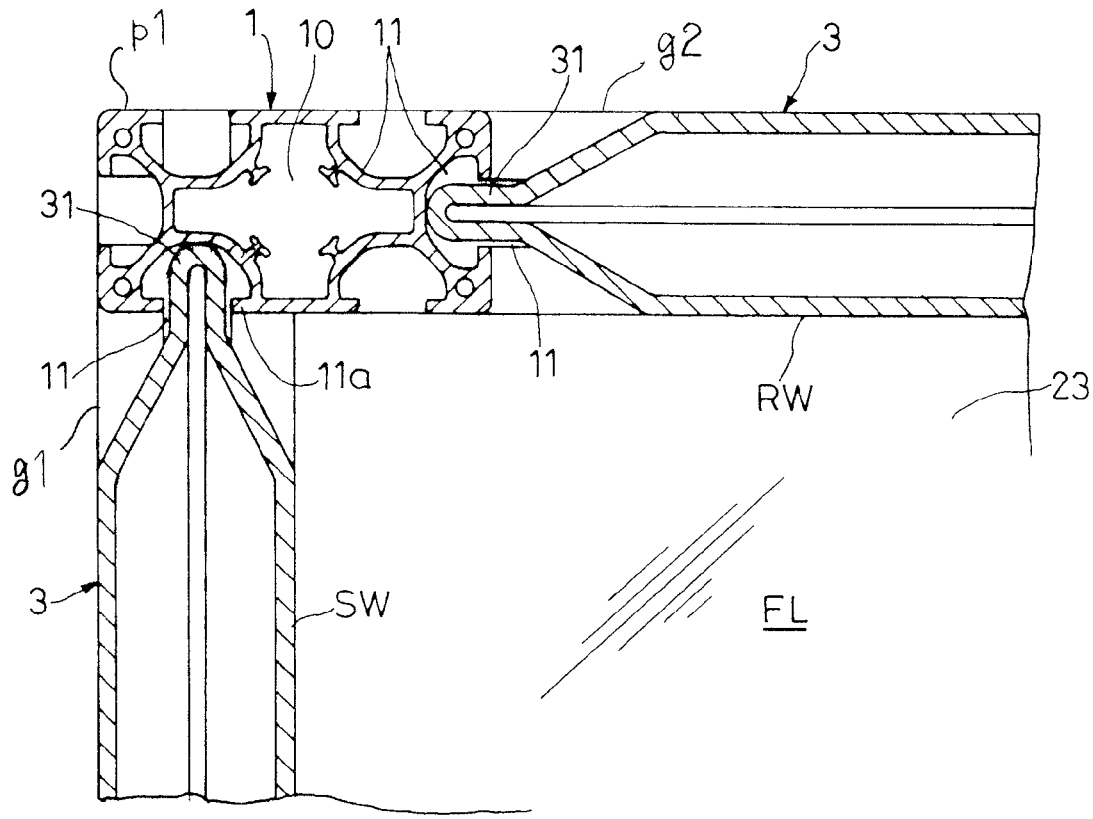
FIG. 12 is a sectional view taken along an arrow line Z-Z of FIG. 11.
Figure 13:
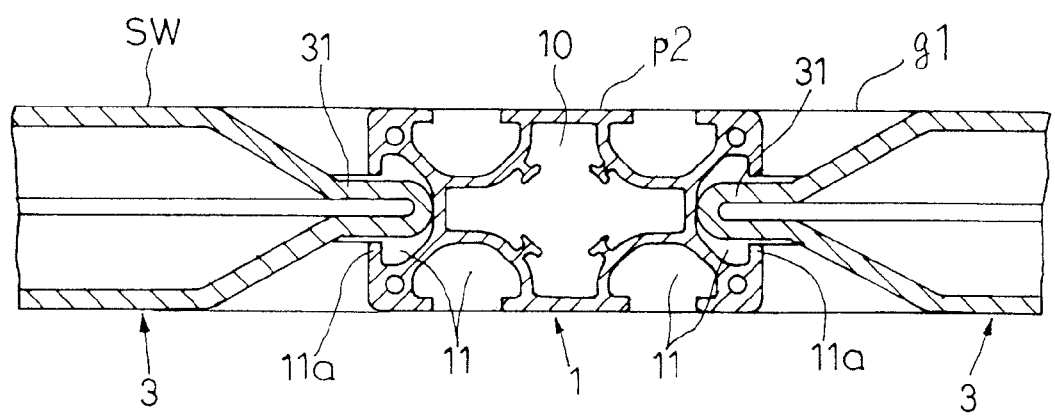
FIG. 13 is a transverse sectional view of a vicinity of the center of a side wall of the capsule room unit.

The ceiling CE and the left and right side walls SW are respectively composed of two pieces of the hollow panel materials 3 arranged at the front and the rear, and the rear wall RW is composed of one piece of the hollow panel material 3. In each hollow panel material 3, the flanges 31 and 32 at the periphery are inserted and fitted to the grooves 11 of surrounding extruded materials 1 constituting the room framework 2. As shown in FIGS. 10 to 12, the hollow panel material 3 constituting the ceiling CE and the left and right side walls SW has the club-shaped flanges 32 undetachably inserted and fitted to the grooves 11 of back-and-forth-direction beams g1 and has the flat flanges 31 inserted and fitted to the grooves 11 of columns p1 and p2 and right-and-left-direction beams g2 and g3. Further, the hollow panel material 3 constituting the rear wall RW has the club-shaped flanges 32 undetachably inserted and fitted to upper and lower beams g2 along the right-and-left-direction and has the flat flanges 31 inserted and fitted to the grooves 11 of left and right columns p1.

On the other hand, as the floor panel material 4, the same hollow panel material 3 as the above can be used, but a rigid flat plate such as a plywood laminate (a composite panel) is preferable in terms of load bearing strength. In the case of an upper capsule room unit in a two-level installation structure, a fireproof board such as a gypsum plaster board may be used for the floor panel material 4 as well. Such a fireproof board that is arranged on the floor FL side of the upper capsule room unit is necessary to prevent a fire spreading between upper and lower capsule room units at the time of fire.]

Figure 14:
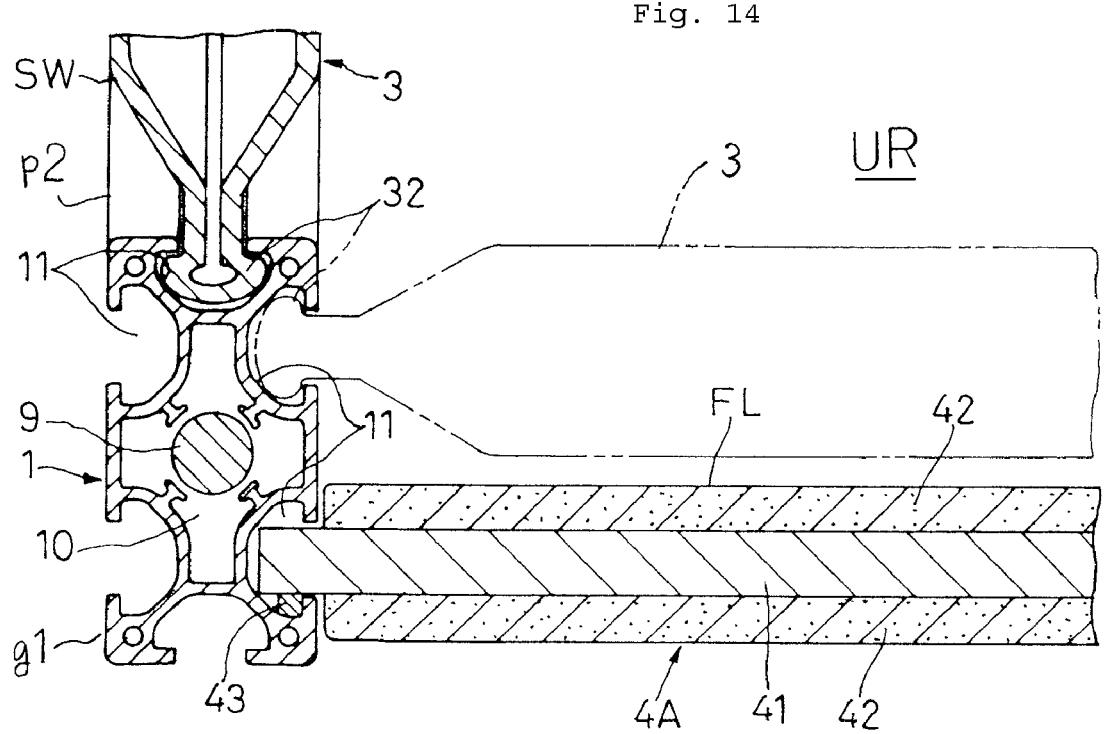
FIG. 14 is a longitudinal sectional front view of a left side lower portion of the capsule room unit used for an upper side in a two-level installation structure.

FIG. 14 is a configuration example of a floor FL of an upper capsule room unit UR in a two-level installation structure, herein a fireproof board 4A provided with inorganic heat insulating layers 42 such as plaster on an upper and a lower surface of the plywood laminate 41 is used for the floor panel material as well, and a protruding periphery of the plywood laminate 41 is inserted and fitted to the grooves 11 of the beams g1 to g3. A rod-shaped spacer 43 supporting the periphery of the plywood laminate 41 inserted and fitted is inserted inside the groove 11. It is noted that a hollow panel material 3 shown by a phantom line or a rigid flat plate may be arranged above as the floor panel material aside from the fireproof board 4A. However, when the fireproof board is used for the floor panel of the upper capsule room unit, too, as in the embodiment, cost of components are reduced accordingly, and also the assembling and manufacturing of the capsule room unit takes less time and effort. Further, as the fireproof board, a plywood laminate 41 provided with an inorganic heat insulating layer 42 only on the lower surface side thereof can be used as well.

Figure 15:
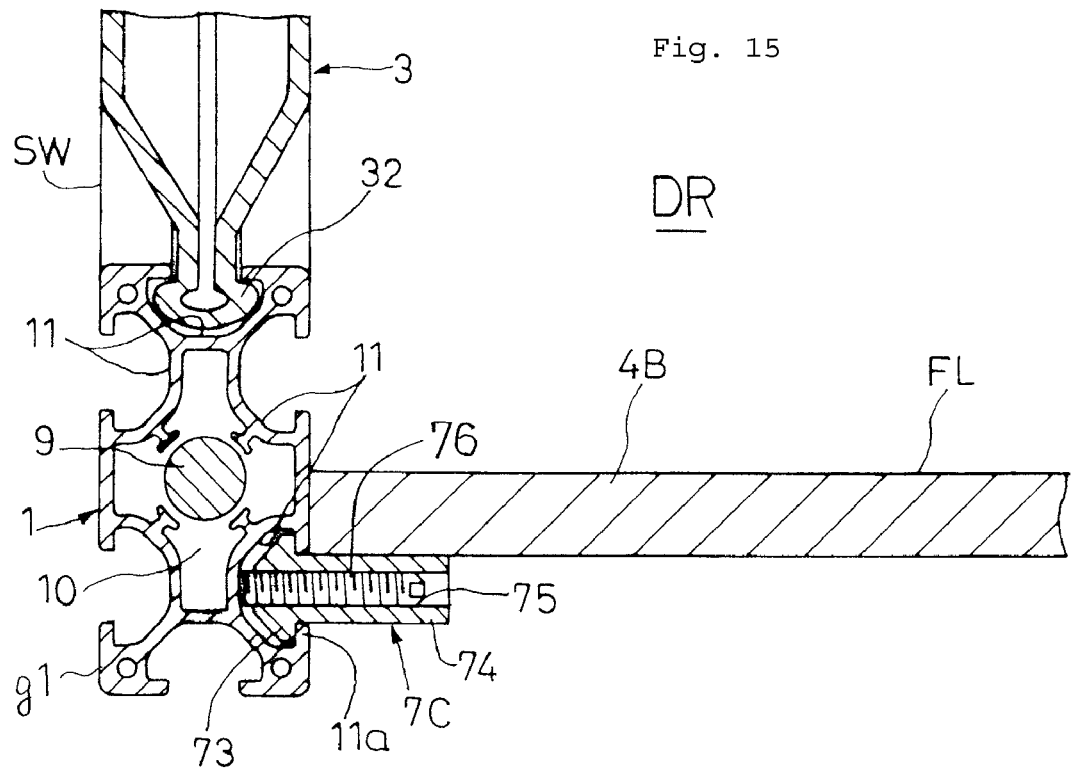
FIG. 15 is a longitudinal sectional front view of a left side lower portion of the capsule room unit used for a lower side in a two-level installation structure.

FIG. 15 is a configuration example of a floor FL of a lower capsule room unit DR in a two-level installation structure or a capsule room unit which is not installed as a two-level. Herein, a floor panel material 4B composed of a thick plywood laminate is arranged in such a manner that a periphery thereof is supported by a number of receiving fittings 7C having been fitted into the grooves 11 of the beams g1 to g3. Moreover, the receiving fitting 7C includes a head portion 73 having the same shape as the grooved nut 7A and integrally formed with a shaft portion 74. A locking screw 76 is threadingly inserted into a threaded hole 75 penetrating the shaft portion 74 to the head portion 73. The head portion 73 is slidingly inserted and fitted inside the groove 11, and the locking screw 76 is tightened in a state of the shaft portion 74 projecting from the groove 11, whereby the receiving fitting 7C is fixed to the groove 11.

Figure 16A:
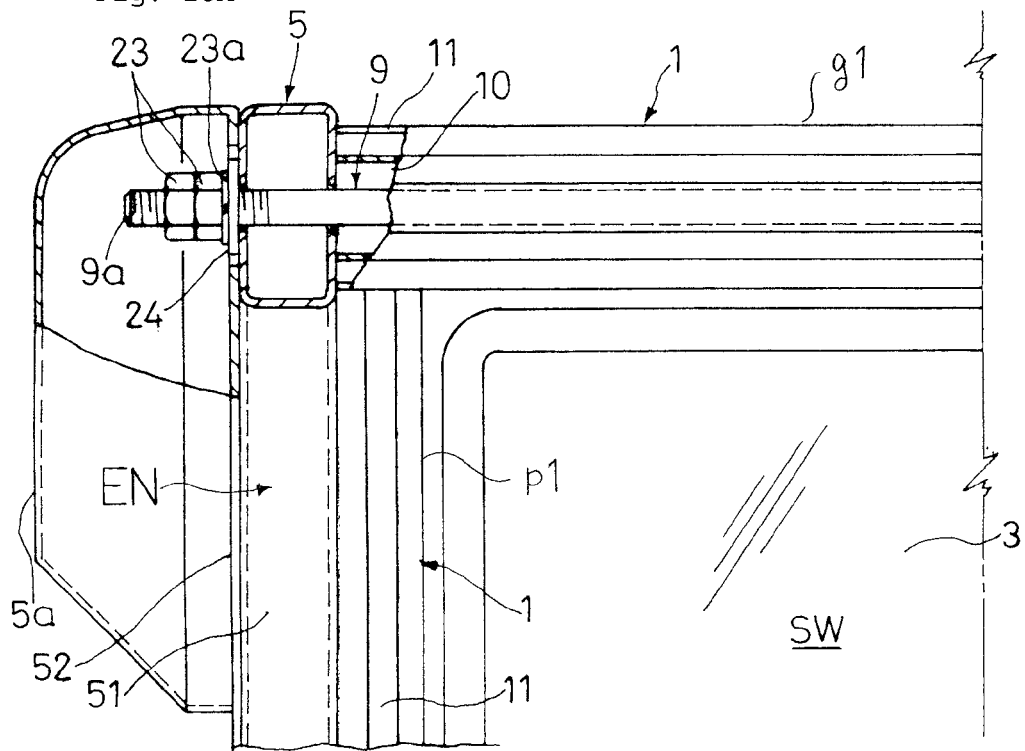
FIG. 16A-C shows a mounting state of a coupling shaft in the capsule room unit.
Figure 16B:
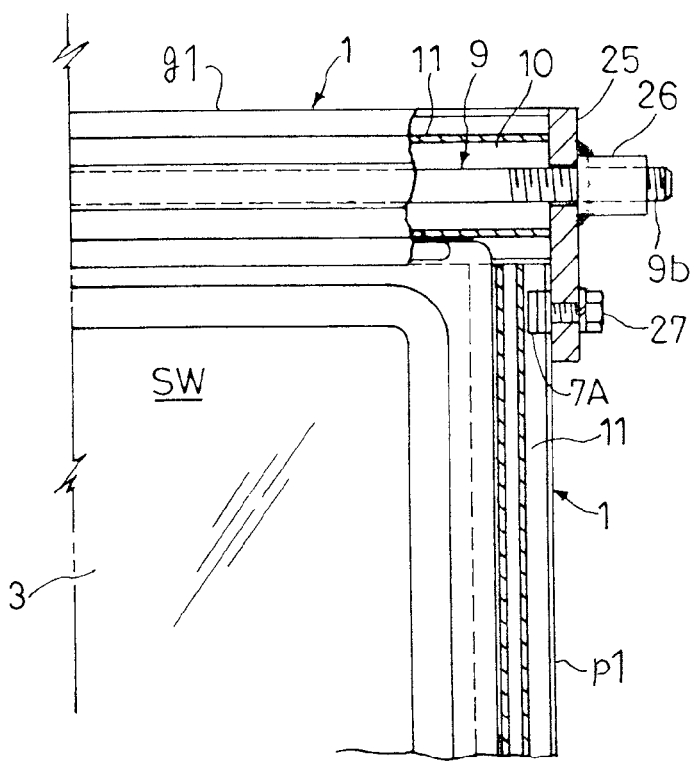
Figure 16C:
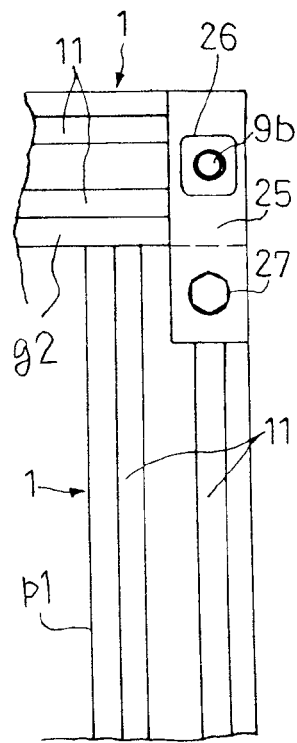

On the other hand, a coupling rod 9 having threaded portions 9a, 9b at both ends thereof is inserted into four of upper, lower, left and right beams g1 along the back-and-forth direction of the room framework 2, respectively, while penetrating through the inside of the hollow portion 10 of the extruded material 1 of each beam. A front end side of the coupling rod 9 projects from the end surface 1a of the extruded material 1 and penetrates a base frame 51 of the dressed frame 5 of the entrance opening EN, the base frame composed of a steel channel bar, as shown in FIG. 16A. A nut 23 is threadingly attached to the threaded portion 9a via a backing plate 24 and a washer 23a. Moreover, a rear end side of the coupling rod 9 penetrates a vertically oblong rectangular steel backing material 25 having been applied to the end surface 1a of the extruded material 1, and the threaded portion 9b thereof is threadingly inserted into a fixing nut 26 integrally welded to the backing material 25, as shown in FIG. 16B and FIG. 16C.

The nut 23 threadingly attached to the threaded portion 9*a* at the front end side of each coupling rod 9 is tightened while the threaded portion 9*b* at the rear end side is threadingly inserted into the fixing nut 26 of the backing material 25. As a result, the entire room framework 2 is tightened up in the back-and-forth direction securely between the base frame 51 of the dressed frame 5 and the backing material 25, whereupon assembly strength of the room framework 2 is significantly increased. Moreover, there is provided a dressing cover portion 5*a* expanding in four corners of an exterior frame 52 to cover the outside of the base frame 51 of the dressed frame 5, and this dressing cover portion 5*a* hides a thread engagement portion between the threaded portion 9*b* at the front end of each coupling rod 9 and the nut 23. Also, the backing material 25 at the rear portion side has an end portion away from the fixing nut 26 and through which a locking bolt 27 is penetrated, and the locking bolt 27 is threadingly fitted to the grooved nut 7A having been inserted and fitted to the groove 11 of the column p1, thereby preventing accompanying rotations at the time of tightening the nut 23 at the front end side.

In the capsule room unit R as configured above, the horizontally oblong rectangular parallelepiped room framework 2 composed of the extruded materials 1 with the grooves 11 is fitted with the panel materials 3 and 4 to constitute the ceiling CE, the floor FL and the walls SW, RW. Accordingly, there is no need to construct the room main body and the support frames separately and assemble them as in the conventional manner. In addition, there is no need to provide machining such as boring, removing, cutting, screw cutting, etc., to the extruded materials 1 at the time of coupling the respective ends of extruded materials 1 arranged orthogonal to each other in the room framework 2. The ends can be coupled and fixed extremely easily and reliably only by screwing operation with the use of screw clamp fittings such as the grooved nut 7A or 7B or inner joint 8 inserted and fitted to the respective wide bottom grooves 11 of the extruded materials 1. Furthermore, the hollow panel material 3 constituting the ceiling CE and the walls SW, RW is such that the flanges 31 and 32 at the periphery thereof have only to be inserted and fitted to the grooves 11 of the extruded materials 1. Consequently, the assembling and mounting to an installation site thereof can be carried out with less effort, with ease and a high degree of efficiency in a short time.

The ceiling CE and the walls SW and RW are composed of the hollow panel materials 3 in this capsule room unit R, and accordingly, high sound insulation performance and thermal insulation performance can be attained. Furthermore, the flanges 31 and 32 at the periphery of the panel material 3 are inserted and fitted to the grooves 11 of the extruded materials 1 and a gap communicating inside and outside the room is not created. As a result, light leakage between the inside and the outside and drafts can be completely prevented, whereby excellent comfortability as a private space particularly for a capsule bed can be secured. Further, wiring to various parts in the room can be provided so as not to be exposed by using the grooves 11 and hollow portion 10 of the extruded material 1, and a reduction in the cost of components and components management can be achieved by the commonality of the extruded material 1 among the respective portions of the room framework 2 and the hollow panel material 3 among the respective surfaces.

It is noted that the extruded material 1 constituting each portion of the room framework 2 is most preferably a light metal extruded material such as aluminum or aluminum alloys, which was mentioned above, but a synthetic resin or ceramic extruded material can be used as well. Further, as this extruded material 1, one having a variety of cross sectional shapes except for the one as exemplified in the embodiment can be used. Also, the number and the formation position of the groove 11 can be configured in various ways. However, when the columns p1 and p2 and beams g1 to g4 of the room framework 2 are composed of extruded materials 1 each having a plurality of grooves 11 and the same sectional shape, the entire room framework 2 can inexpensively be constructed of a single raw material, and the lengths of the extruded materials 1 have only to be made in agreement and there is no need to make the use suit for the front, rear, right, left, top and bottom at the time of assembly. As a result, effort in assembling operation is remarkably saved. In particular, when an extruded material 1 having a sectional outline of a rectangle at an aspect ratio of 2/1 and provided with one groove on respective narrow side surfaces and two grooves on respective wide side surfaces is used, differences in orientation of the grooves used by components of the room framework 2 and in the number of the grooves can be dealt with easily. Further, the extruded material has the same shape when inverted, and accordingly it provides usability at the time of assembling the room framework 2. In addition, when the extruded material 1 having a hollow portion 10 positioned in a width-direction central portion which is not in communication with the grooves 11 is used, the hollow portion 10 can be used as an insertion part of the afore-described coupling rod 9 or a wiring space, and the extruded material 1 itself advantageously becomes very strong.

On the other hand, as the hollow panel material 3, the exemplified synthetic resin or FRP blow-molded article is preferable. However, a tray-shaped molded article halving the hollow panel material 3 in a thickness direction is produced by a variety of synthetic resins or FRPs (including resin impregnated woven cloth) and two pieces of the articles may be bonded to produce the hollow panel material 3. Further, a hollow panel material 3 whose entire periphery is the flat flange 31 also can be used. However, if the club-shaped flange 32 of the hollow panel material 3 is inserted and fitted to the wide bottom groove 11 of the extruded material 1 undetachably in the vertical direction as in the embodiment, there is no concern that the hollow panel material 3 is detached from the room framework 2 even when a large force is applied to the panel surface, for example, somebody leans against the panel surface. As a result, high reliability as a capsule bed can be attained. Conversely, a hollow panel 3 whose entire periphery is the club-shaped flange 32 can be used as well. On this occasion, the panel material 3 is held more tightly by the room framework 2, but there is a disadvantage that the assembling procedure of the extruded material 1 of each portion of the room framework 2 and the hollow panel material 3 becomes very complicated in slidingly inserting and fitting all club-shaped flanges 32 at the periphery to the grooves 11 of the extruded materials 1 from one end.

The screw clamp fitting used to couple the columns p1 and p2 and beams g1 to g4 of the room framework 2 to each other is not limited to the exemplified grooved nuts 7A and 7B or inner joint 8. The fitting may include one which can be screw-clamped in a form slidingly insertable and fittable to the groove 11 of the extruded material 1 and not detachable vertically, or further a form of becoming undetachable by being turned (generally turned 90 degrees) after being inserted vertically to the groove 11. For example, a grooved bolt 7D whose head portion is inserted and fitted inside the groove 11 and whose screw shaft is protruded from the groove 11 (see FIG. 18A-B) can be used as well, contrary to the grooved nut. Further, as the coupling tool used in combination with these screw clamp fittings, ones in various forms other than the exemplified exterior L-shaped fitting 6 and L-shaped backing plate 21 can be used.

On the other hand, the capsule bed is generally installed at two levels, upper and lower, and the capsule room unit of the foregoing embodiment is superior in applicability to the two-level installation. For example, FIG. 17A-B shows a configuration of assembling together four capsule room units in two rows in a two-level installation structure. In this configuration, a handrail 53 to be held onto when going in and out of an upper capsule room unit UR is mounted to a longitudinal portion of the base frame 51 of the dressed frame 5 of the capsule room unit UR. Further, steps 54A to 54C for ascending and descending with respect to the upper capsule room unit UR are mounted throughout longitudinal portions in a row of respective base frames 51 of the lower two capsule room units DR. Each base frame 51 of the dressed frames 5 of the respective capsule room units R (UR, DR) is made of high-strength steel and is coupled to the backing material 25 formed of steel and arranged at the rear portion side of the room framework 2, by the coupling rod 9 having been inserted through the upper, lower, left or right beam g1, thereupon being superior in support strength. Thus, a high degree of mounting strength and support strength in the handrail 53 and steps 54A to 54C mounted on the base frame 51 can be secured, and high reliability can be given to these accessories to which a user's weight is applied.

Figure 18A:
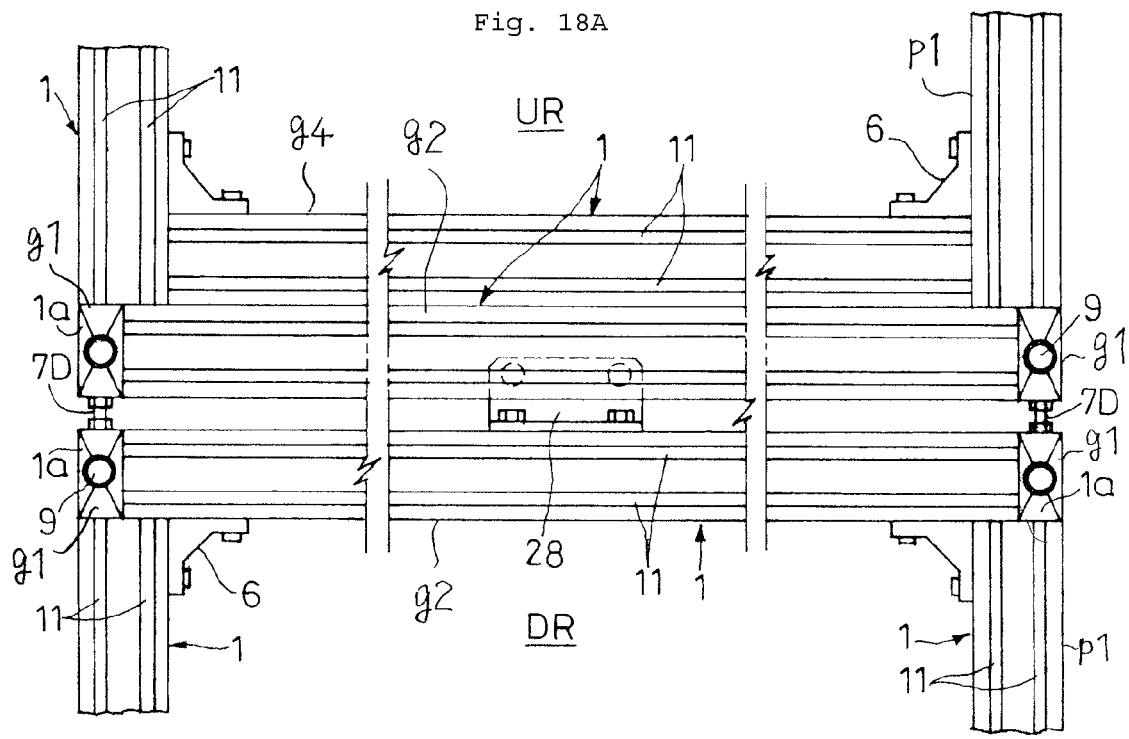
FIGS. 18A-C shows a stacked state of the upper and lower capsule room units in a two-level installation structure.
Figure 18B:
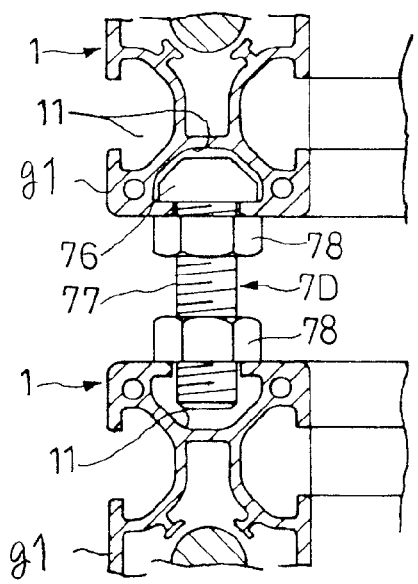

The upper capsule room unit UR in the two-level installation structure is supported on the lower capsule room unit DR while slightly suspended, as shown in FIG. 18A and FIG. 18B. A procedure thereof is first to slidingly insert and fit a head portion 76 of a plurality of grooved bolts 7D into the groove 11 on the lower surfaces side of the lower side left and right beams g1 in the upper capsule room unit UR, to threadingly secure a nut 78 to a screw shaft 77 downwardly projecting of each grooved bolt 7D, thereby fixing the grooved bolt 7D at a predetermined position, and to threadingly engage another nut 78 with a lower portion of the screw shaft 77. Then, the upper capsule room unit UR is carried on the lower capsule room unit DR, and each screw shaft 77 of the grooved bolts 7D is inserted into the groove 11 on the upper surface side of the upper side left and right beams g1 in the lower capsule room unit DR, the nut 78 threadingly engaged therewith is made to stride over the groove 11 to abut, thereby making a load of the upper capsule room unit UR be supported on the lower capsule room unit DR. Further, a suspension height of the upper capsule room unit UR can be adjusted by changing a thread engagement height of the nut 78 in the grooved bolt 7D.

Figure 18C:
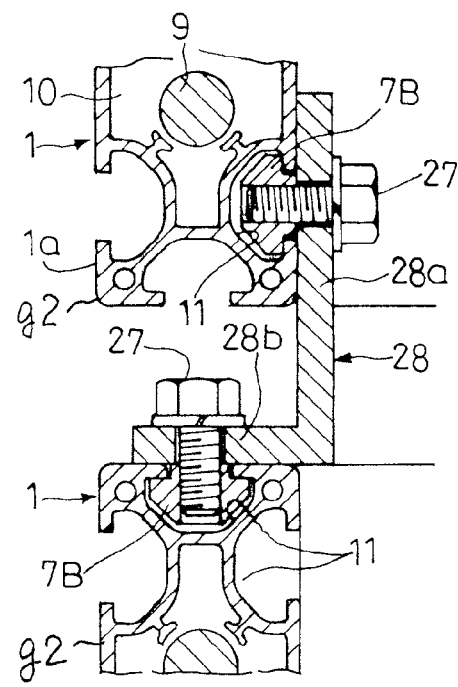

Further, in the foregoing two-level installation, an L-shaped positioning plate 28 is mounted on a front upper side beam g2 of the lower capsule room unit DR as shown in FIG. 18A and FIG. 18C, and a front lower side beam g2 of the upper capsule room unit UR to be carried thereon is made to abut against a front surface of a vertical piece 28a of the positioning plate 28, whereby back-and-forth-direction positioning of the upper capsule room unit UR is carried out. The positioning plate 28 has a horizontal piece 28b through which a mounting bolt 27 is penetrated, and the mounting blot 27 is threadingly secured to a grooved nut 7B having been inserted and fitted inside the groove 11 of the beam g2, whereby the positioning plate 28 is mounted on the lower capsule room unit DR side. Another mounting bolt 27 penetrated through the vertical piece 28a is threadingly secured to a grooved nut 7B having been inserted and fitted inside the groove 11 of the beam g2 of the upper capsule room unit UR after being positioned in the same manner, whereby the positioning plate 28 is coupled and fixed to the upper capsule room unit UR as well.

It is noted that a rolling up curtain is generally provided at the entrance opening of the capsule bed for shielding. To the entrance opening EN of the capsule room unit R of the present invention, a curtain or folding shutter which opens and closes with the grooves 11 of the extruded material 1 constituting the room framework 2 serving as guide rails can be attached easily.

Figure 19B:
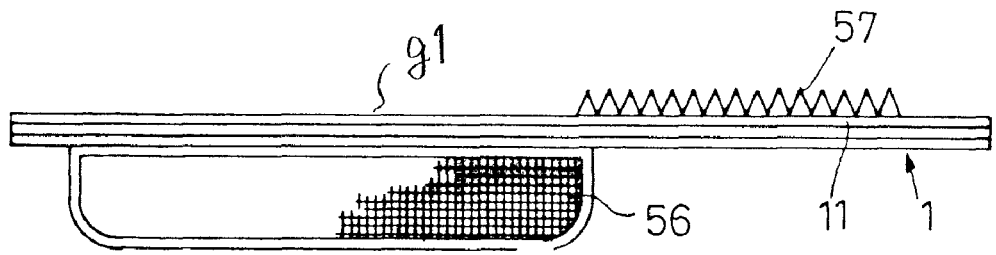
FIGS. 19A-B shows a capsule room unit (capsule room units) in a two-level installation structure according to another embodiment of the present invention.
Figure 19A:
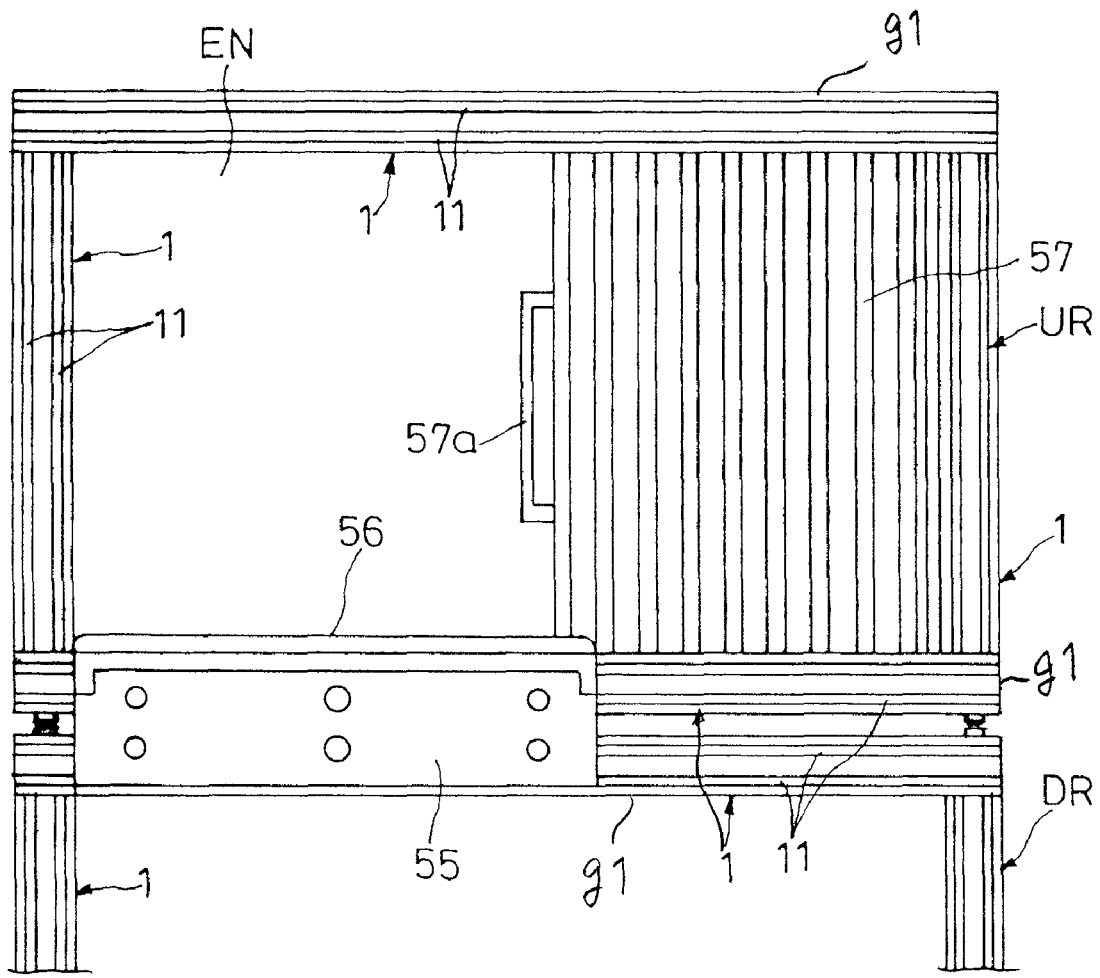

Further, for a capsule room unit with a lateral entrance, an entire surface along a longitudinal direction of the capsule room unit UR is made open as shown in FIG. 19A and FIG. 19B for example, and an accordion shutter 57 having a handle 57a and horizontally stretchingly opening and closing with the grooves 11 of extruded materials 1 constituting the upper and the lower beam g1 of the capsule room unit serving as guide rails is mounted. It may be configured such that an opening width can be changed freely by the opening and closing of the shutter 57 and a shielding of the entire surface can be provided. Reference numeral 55 in the drawings denotes a support frame of a front step 56 provided at an entrance portion of the upper capsule room unit UR. The support frame 55 is screw-clamped via screw clamp fittings (not shown) having been inserted and fitted to the grooves 11 of beams g1 of the upper and lower capsule room units UR, DR with the use of the above grooves 11.

The capsule room unit according to the present invention is preferable particularly as a capsule bed for simple lodging. However, the capsule room unit can be used to constitute a variety of private spaces used for sleeping, resting, temporary housing in a disaster, habitation in special environments or the like other than the capsule bed.

Description of Reference Numerals

1: Extruded material
1a: End surface
10: Hollow portion
11: Groove
11a: Flange
2: Room framework
23, 26: Nut
25: Steel backing material
3: Hollow panel material
30: Panel main body
31: Flat flange
32: Club-shaped flange
4, 4B: Floor panel material
4A: Fireproof board
41: Plywood laminate
42: Inorganic heat insulating layer
5: Dressed frame
51: Base frame (Steel backing material)
57: Shutter
6: Exterior L-shaped fitting
7A, 7B: Grooved nut (Screw clamp fitting)
8: Inner joint (Screw clamp fitting)
9: Coupling rod
9a, 9b: Threaded portion
R: Capsule room unit
UR: Upper capsule room unit
DR: Lower capsule room unit
EN: Entrance opening
CE: Ceiling
SW: Side wall
RW: Rear wall
FL: Floor
g1 to g4: Beam
p1, p2: Column

What is claimed is:

1. A capsule room unit comprising:
   columns located in four room corners, respectively;
   beams bridged between upper ends and lower ends of the columns;
   a horizontally oblong rectangular parallelepiped room framework formed by the columns and the beams;
   panel materials fitted into the room framework to constitute a ceiling, a floor and walls,
   wherein the columns and the beams are composed of elongated frame members each having a plurality of longitudinally consecutive grooves having a wide bottom,
   the elongated frame members having a hollow portion located in a central portion,
   the panel materials of the ceiling and walls are comprised of synthetic resin or FRP hollow panel materials each having flanges at a periphery thereof along a plane direction, and the flanges of the hollow panel materials are inserted and fitted to the grooves of the elongoated frame members,
   ends of the elongated frame members arranged orthogonal to each other in the room framework are coupled to each other via a screw clamp fitting slidably inserted and fitted to the plurality of grooves in the elongated frame members,
   regarding a side surface provided with an entrance opening in the room framework as a front side surface, end surfaces of back-and-forth-direction beams constituting the room framework are positioned in four corners of the front side surface and a rear side surface, respectively,
   a coupling rod inserted into the hollow portion of each of the beams has a threaded portion at both ends thereof penetrating steel backing materials which are made to abut against front and rear end surfaces of the beams, respectively,
   nuts are threadingly secured to the front and rear threaded portions from the outside, and
   the steel backing material at the front side surface constitutes a rectangular frame which covers the front side surface of the room framework, and a locking fastener directed through the steel backing material at the rear side surface, said locking fastener being connected to one of said columns of the room framework.

2. The capsule room unit according to claim 1, wherein flanges parallel to each other of the hollow panel material are formed into a club shape, the grooves of the elongated frame members have an opening width narrower than a thickness of a distal side of the club-shaped flanges, and each of the club-shaped flanges is slidingly inserted and fitted into a groove from one end side.

3. The capsule room unit according to claim 1, wherein the columns and beams of the room framework have an identical sectional shape.

4. The capsule room unit according to claim 1, wherein each elongated frame member has a sectional outline of a rectangle at an aspect ratio of 2/1 and is provided with one groove on respective narrow side surfaces of the rectangle and two grooves on respective wide side surfaces.

5. The capsule room unit according to claim 1, wherein a shutter which opens and closes with the grooves of the elongated frame member serving as guide rails is provided at the entrance opening.

6. A two-level structure of capsule room units comprising:
   upper and lower capsule room units, each capsule room unit constructed in accordance with claim 1; and
   the upper capsule room unit having a floor arranged with a fireproof board.

7. The two-level structure of the capsule room units according to claim 6, wherein the fireproof board is composed of a plywood laminate at least having a lower surface side provided with an inorganic heat insulating layer.

8. The two-level structure of the capsule room units according to claim 6, wherein the fireproof board constitutes the panel material of the floor.

9. The two-level structure of the capsule room units according to claim 6, wherein the grooves are provided at a lower surface side of lower beams in the room framework of the upper capsule room unit and an upper surface side of upper beams in the room framework of the lower capsule room unit, and the upper capsule room unit is supported on the lower capsule room unit by a support fitting positioned between both grooves, while suspended.

10. The two-level structure of the capsule room units according to claim 6, wherein the upper and lower capsule room units are capsule beds.

* * * * *